(12) United States Patent
Schlesser et al.

(10) Patent No.: US 7,771,261 B2
(45) Date of Patent: Aug. 10, 2010

(54) KNIFE BLADE FOR A CHOPPER OF A COMBINE HARVESTER

(75) Inventors: Benjamin Joseph Schlesser, Davenport, IA (US); Justin Cody Freehill, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/468,449

(22) Filed: May 19, 2009

(65) Prior Publication Data

US 2010/0041452 A1  Feb. 18, 2010

Related U.S. Application Data

(60) Provisional application No. 61/088,233, filed on Aug. 12, 2008.

(51) Int. Cl.
*A01F 12/34* (2006.01)
(52) U.S. Cl. ....................................................... 460/71
(58) Field of Classification Search ................. 460/112, 460/69, 70, 80, 71, 66, 79, 119, 63, 121, 460/72; 241/294, 221, 242, 291, 293; 56/14.6, 56/14.5
See application file for complete search history.

(56) References Cited

U.S. PATENT DOCUMENTS

| 4,505,279 | A | * | 3/1985 | Campbell et al. | ............. 460/66 |
| 5,035,675 | A | * | 7/1991 | Dunn et al. | .................. 460/62 |
| 6,036,598 | A | * | 3/2000 | Harden et al. | ................. 406/66 |
| 6,120,373 | A | * | 9/2000 | Schrattenecker | ............ 460/112 |
| 7,059,960 | B2 | * | 6/2006 | Mackin et al. | ................ 460/71 |
| 7,070,498 | B2 | * | 7/2006 | Grywacheski et al. | ........ 460/68 |
| 7,201,652 | B2 | * | 4/2007 | Van De Sluis et al. | ........ 460/16 |
| 7,462,101 | B2 | * | 12/2008 | Grywacheski et al. | ........ 460/68 |
| 2002/0002068 | A1 | * | 1/2002 | Welch | ........................ 460/71 |
| 2005/0020330 | A1 | * | 1/2005 | Mackin et al. | ................ 460/71 |
| 2008/0268928 | A1 | * | 10/2008 | Birrell et al. | ................ 460/112 |

* cited by examiner

*Primary Examiner*—Árpád Fábián-Kovács

(57) ABSTRACT

A knife blade for a chopper rotor is made in at least two members that are coupled together by a web disposed at the bottom of the slot, wherein the slot is configured to receive and pass therethrough a stationary blade that extends perpendicular to the rotational axis of the chopper rotor, the knife blade having a second edge with co-linear portions on each of the at least 2 members, wherein the co-linear portions are disposed generally at a right angle to the slot, and wherein the co-linear portions are configured to cut against a longitudinally extending knife blade (152) that extends generally parallel to the rotational axis of the chopper rotor.

8 Claims, 8 Drawing Sheets

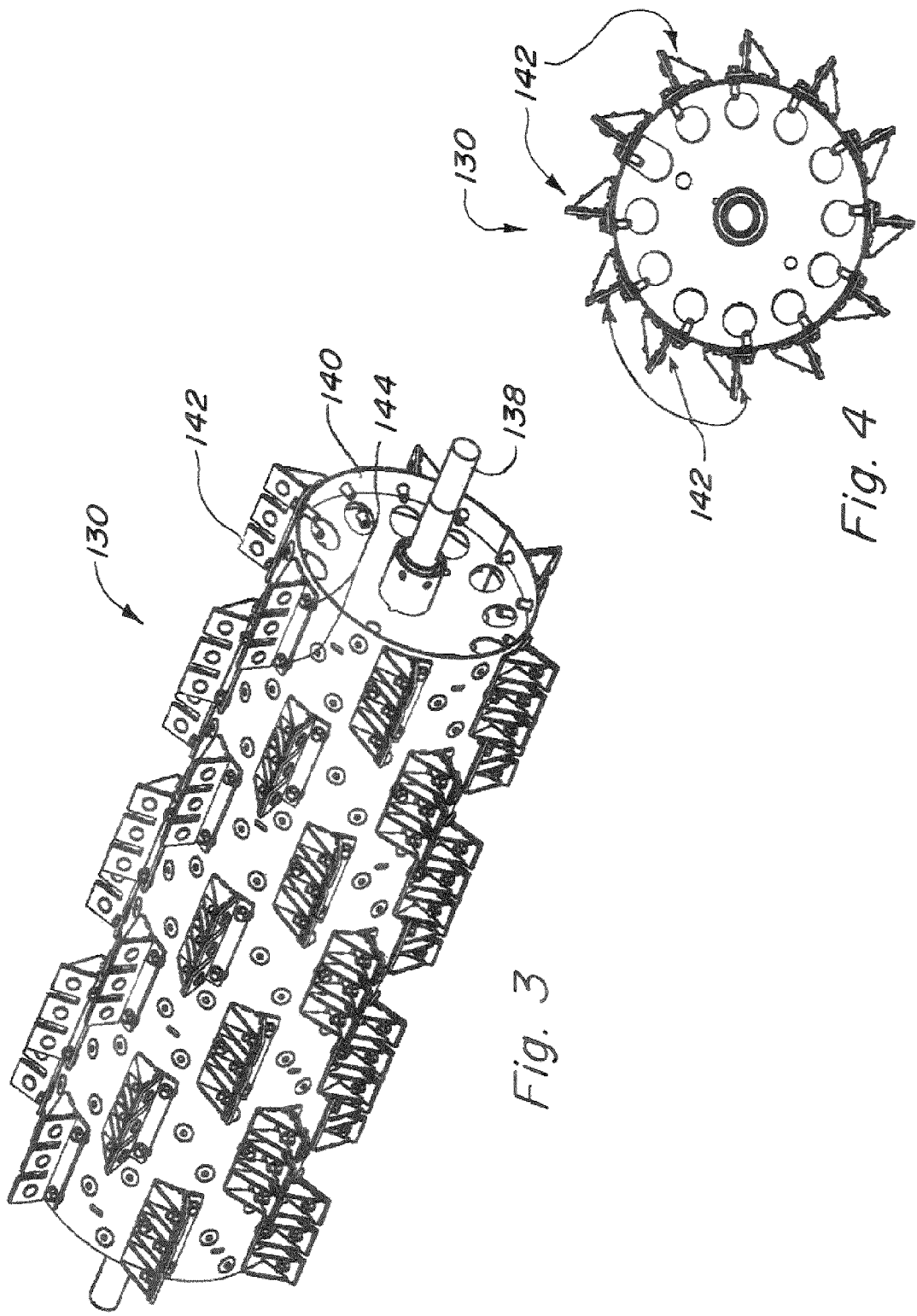

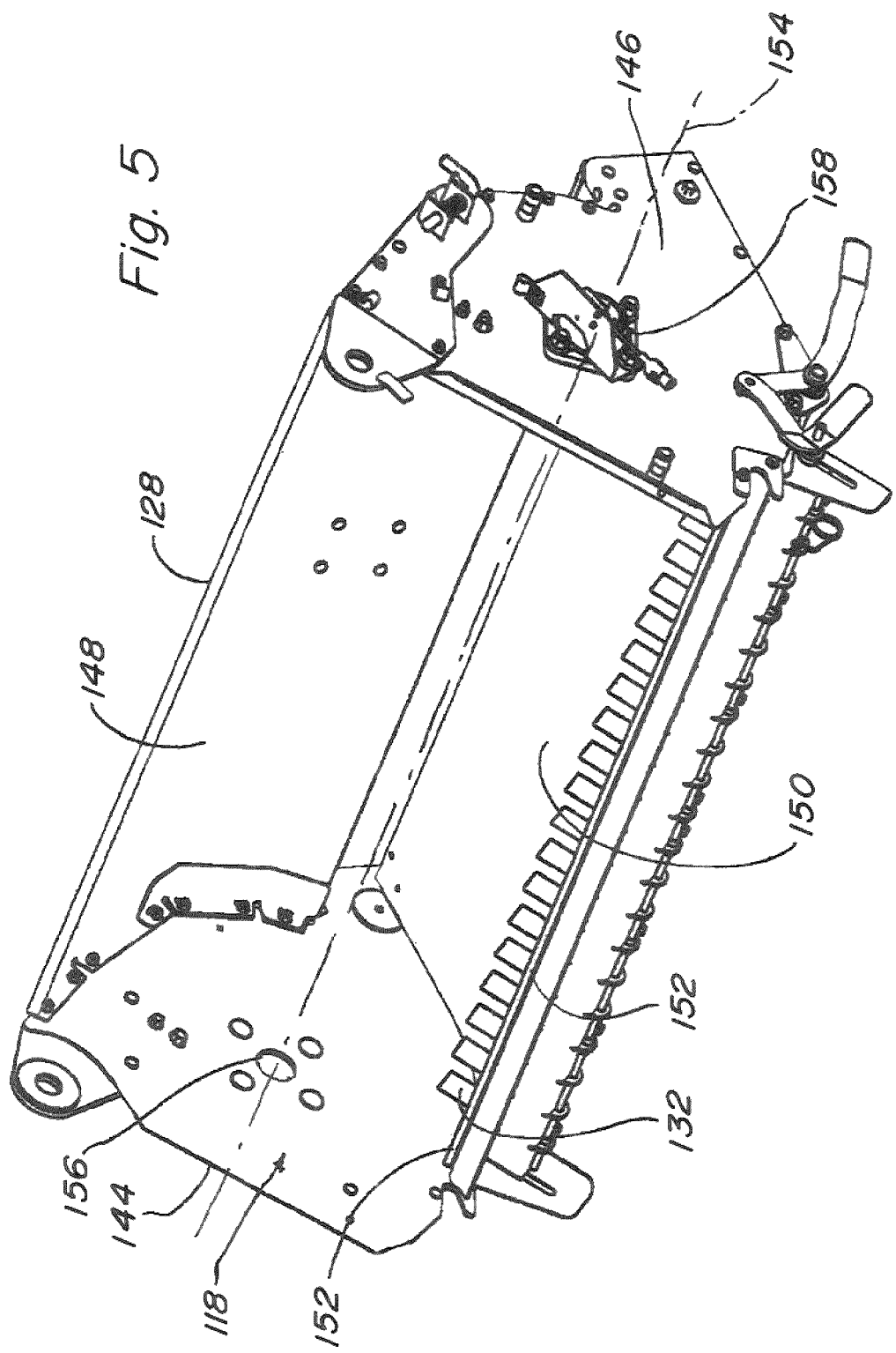

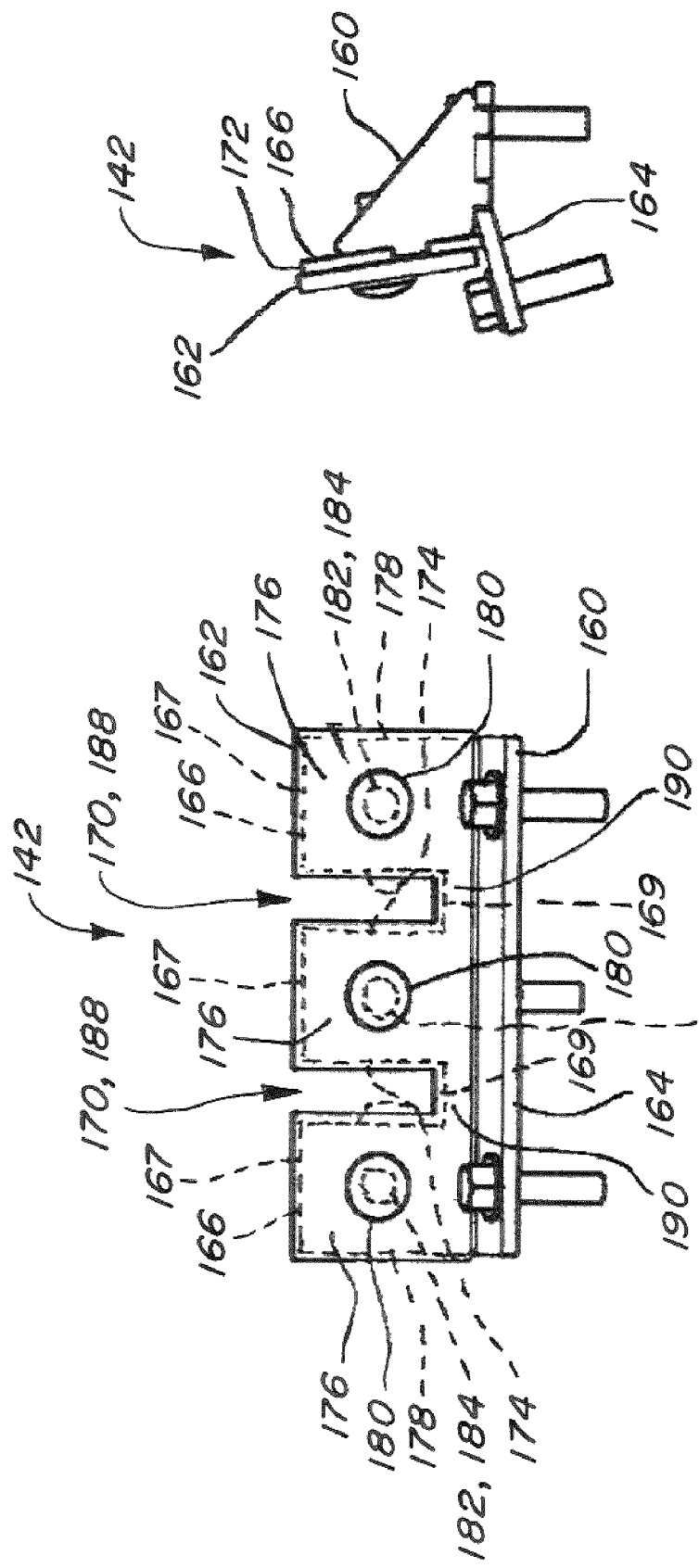

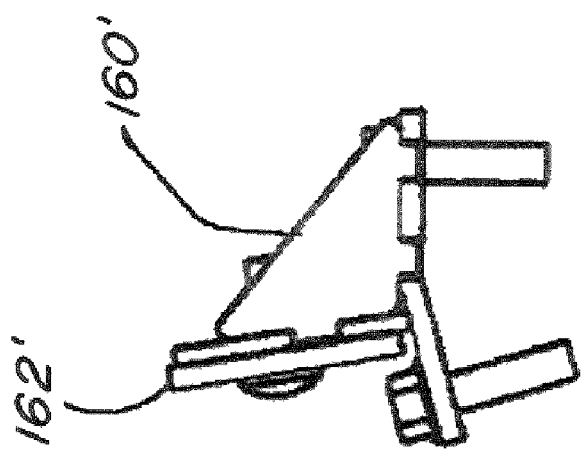
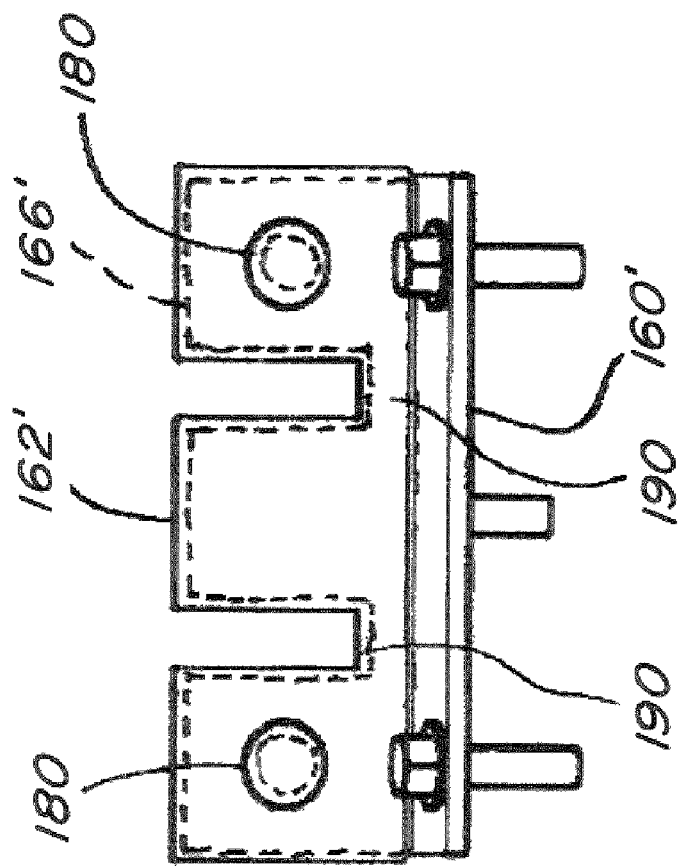
Fig. 9
Fig. 8

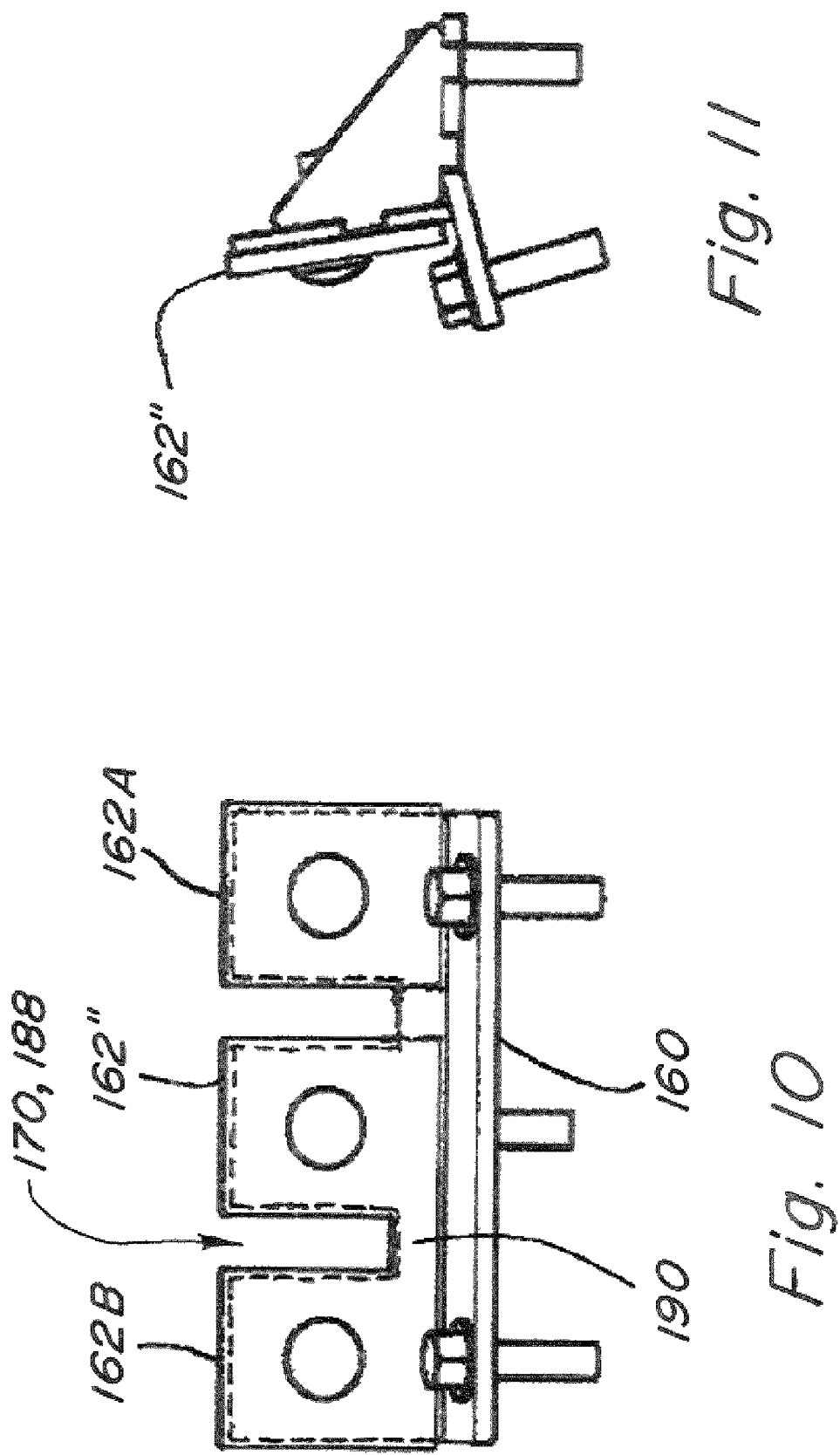

KNIFE BLADE FOR A CHOPPER OF A COMBINE HARVESTER

CROSS REFERENCE TO RELATED APPLICATIONS.

This is a non-provisional application based upon U.S. provisional patent application Ser. No. 61/088,233 entitled "A Chopper Blade for a Chopper of a Combine Harvester", filed Aug. 12, 2008, which is incorporated herein by reference.

FIELD OF THE INVENTION

This invention relates generally to agricultural combine harvesters. More particularly it relates to choppers for such harvesters. Even more particularly, it relates to knife blades for choppers.

BACKGROUND OF THE INVENTION

Agricultural combine harvesters, called "combines" herein, travel through fields harvesting crop plants and separating their crop portions from the residue portions. The crop portions are typically saved in a container on board the combine until the vehicle is unloaded into a trailer or wagon that is located alongside the combine. The crop residue is spread across the ground to be returned to and enriching the soil.

Crop residue from combines such as cornstalks have been proposed in recent years as a source of fuel such as ethanol, or for conversion into other more useful materials such as plastic.

Collecting crop residue such as cornstalks is a problem due to their bulk and the difficulty of chopping them into sufficiently small pieces for compact transport and processing.

Traditional chopper designs are inadequate for processing cornstalks. Traditional choppers have pendulum knife blades attached to the rotor that are permitted to swing back and forth. Such knife blades extend outward from the chopper rotor by centrifugal force. This force is not sufficient to hold them in a chopping position for chopping the large masses of crop residue. New designs have been proposed that provide knife blades that are fixed rigidly to the rotor.

One of these new designs features a chopper rotor having a plurality of knife supports fixed to the rotor, each knife support having 3 blades fastened to a rear surface of a knife support. The knife blades are rigidly fixed to the rotor unlike the pendulum arrangement. In this design, disclosed in co-pending U.S. patent application Ser. No. 12/062,860, each of the 3 blades is fastened to the knife support with two threaded fasteners disposed immediately adjacent to one another, for a total of six fasteners required to attach the three blades on each knife support Sharpening and/or replacing blades on such a chopper rotor requires the separate removal and installation of many knife blades. Each knife blade also needs to be carefully aligned, to ensure a precise gap between each pair of adjacent knife blades to accommodate a stationary blade (fixed to the chopper housing) passing therebetween. This, process is time-consuming.

What is needed, therefore, is a knife blade that reduces the time required to sharpen and/or replace. What is also needed is a knife blade that in at least one configuration reduces the total number of fasteners required to fasten the knife blades to their knife supports. What is also needed is a knife blade that in at least one configuration ensures the proper gap is provided between adjacent knife blades.

It is an object of this invention to provide such a knife blade.

In the discussion below, a "front" view of a blade or blade support on the chopper rotor is a view taken of the leading surface of the blade as the chopper rotor rotates. The "front" surface or "front" face will therefore be the leading surface or face of the blade as it is rotated on the chopper rotor, and the direction of the view is to the rear, away from the direction of travel. The "rear" view of a blade on the chopper rotor is the view taken from behind the blade or blade support on the chopper rotor as the chopper rotor rotates showing the trailing surface of the blade or blade support. Likewise the "rear" surface or "rear" face will be the trailing or rearward facing surface or face of the blade or blade support.

SUMMARY OF THE INVENTION

In accordance with one invention disclosed herein, a knife blade for mounting on a knife support of a chopper rotor has at least one slot for passing or cutting against a stationary blade that lies in a plane that is generally perpendicular to the axis of rotation. The slot divides the knife blade into at least two members joined together with a narrow web. These at least two members have edges that are disposed to cut against a longitudinally extending knife in the chopper housing that is fixed to the chopper housing and extends generally parallel to the rotational axis of the chopper rotor. The knife blade may be fixed to a leading face or trailing face of the knife support. It may have a sharpened edge to cut against the longitudinally extending knife. The at least one slot may be disposed at right angles to the sharpened edge. A hole may be provided in each of the at least two members to receive a threaded fastener to fix the blade on the knife support.

In accordance with a second invention disclosed herein,

BRIEF DESCRIPTION OF THE DRAWINGS

FIG. 3 is a perspective view of the chopper rotor of the chopper of FIG. 1.

FIG. 4 is an end view of the chopper rotor of the chopper of FIG. 1.

FIG. 5 is a perspective view of the chopper housing of the chopper of FIG. 1.

FIG. 6 is a front view of a typical knife blade and blade support of the rotor of FIG. 3.

FIG. 7 is an end view of the typical knife blade and blade support of the rotor of FIG. 3.

FIG. 8 is a front view of an alternative knife blade and blade support usable on the rotor of FIG. 3.

FIG. 9 is an end view of the alternative knife blade and blade support usable on the rotor of FIG. 3.

FIG. 10 is a front view of another alternative knife blade and blade support usable on the rotor of FIG. 3.

FIG. 11 is an end view of another alternative knife blade and blade support usable on the rotor of FIG. 3.

DETAILED DESCRIPTION OF THE PREFERRED EMBODIMENTS

Figure 1:
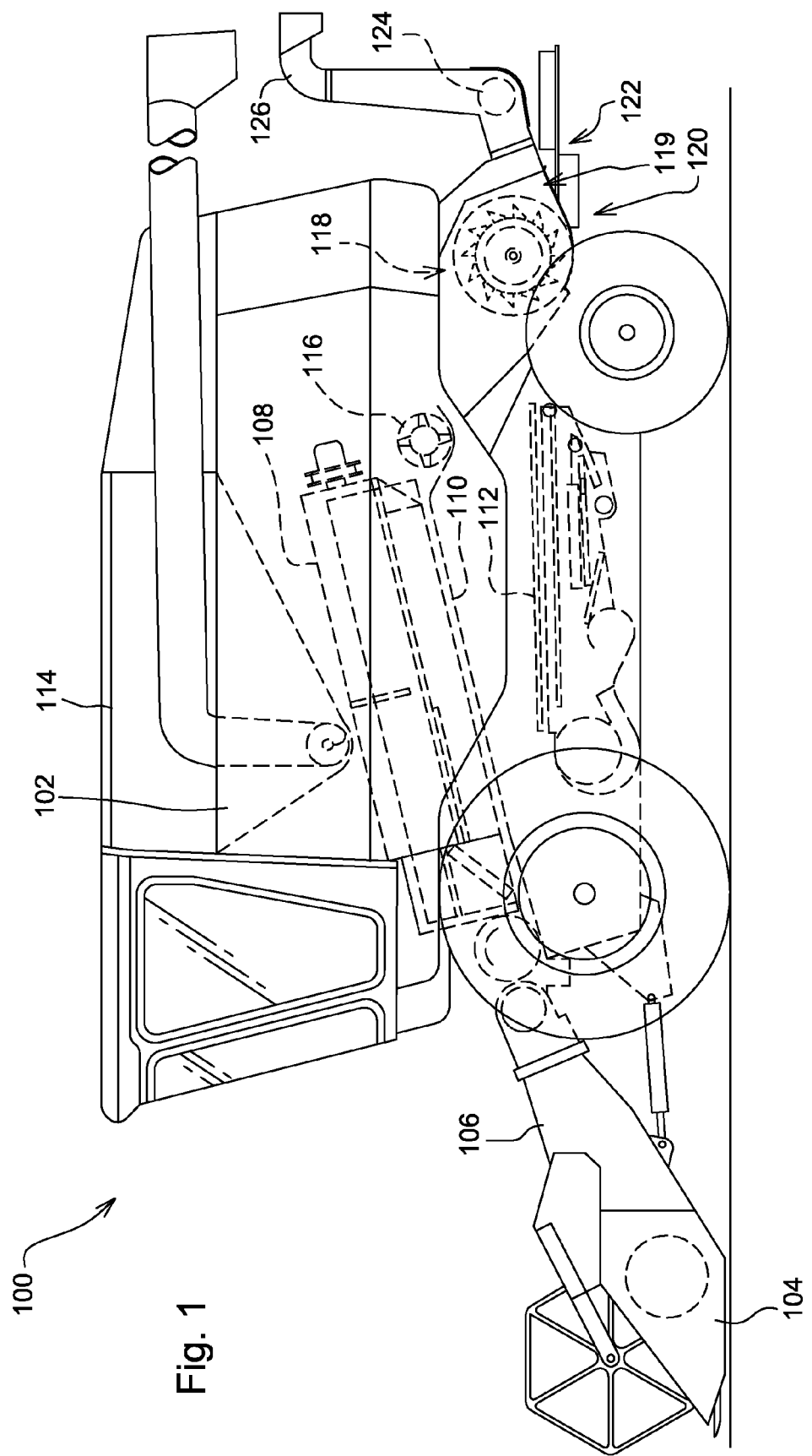
FIG. 1 is a side view of a combine in accordance with the present invention.

FIG. 1 illustrates an agricultural combine harvester (hereinafter "combine") 100 in accordance with the present invention. The combine comprises a combine vehicle 102 having a corn head 104 supported on a feederhouse 106 that is mounted on the front of combine vehicle 102. A longitudinally extending rotor 108 is disposed to rotate within a concave 110 to separate crop material (i.e. grain) from crop residue.

An oscillating cleaning shoe 112 is supported underneath the concave to receive crop material. The crop material is cleaned in the cleaning shoe and is carried upward into a grain tank 114. Crop residue leaving the rear end of rotor 108 is directed into a beater 116 which separates some residual crop material from the crop residue and directs that residual crop material into the cleaning shoe 112. Crop residue exiting the beater 116 is directed rearward into an inlet 118 of chopper 120. Similarly, crop residue separated from the material in the cleaning shoe 112 is also directed into chopper 120. The crop residue exiting beater 116 typically includes cornstalks. The crop residue exiting the cleaning shoe typically includes chaff and other light crop residue.

Chopper 120 chops the crop residue and sends it rearward through a conduit 122 into a blower 124 which directs the crop residue into a conduit 126. Conduit 126 directs the crop residue into a wagon or other vehicle, traveling next to or behind the combine 100.

In this way all of the corn plant is gathered. The grain is saved in grain tank, and the crop residue (including the cornstalks) is chopped and sent to a wagon for later use.

Figure 2:
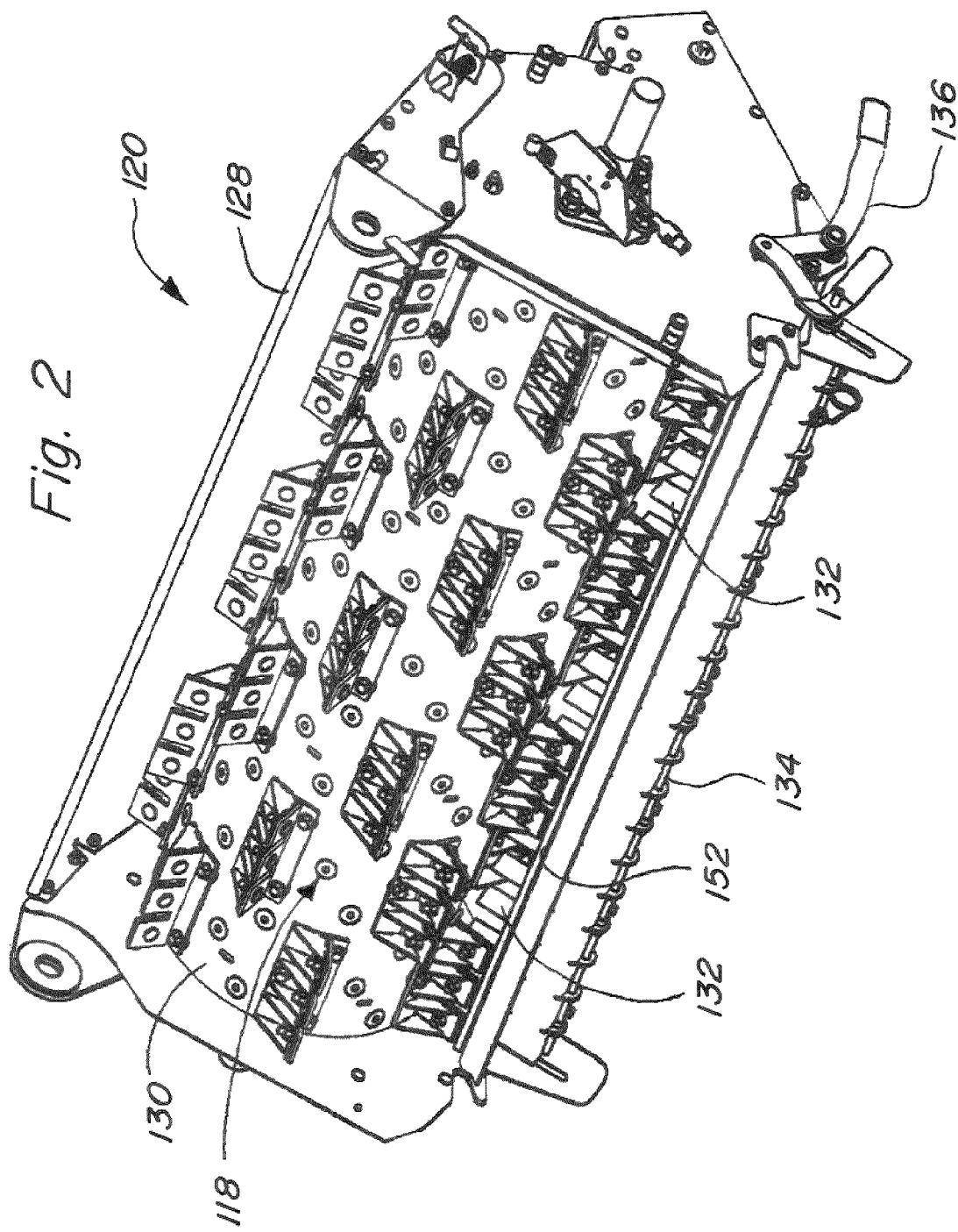
FIG. 2 is a perspective view of the chopper of the combine of FIG. 1.

FIG. 2 is a perspective view of chopper 120 showing the chopper housing 128 in which the chopper rotor 130 is disposed. Chopper housing 128 has an inlet 118 extending substantially the entire width of chopper rotor 130. A row of stationary blades 132 extend into the chopper housing 128. They are attached to a knife bar 134 disposed outside the chopper housing 128 that is movable by a lever 136. As lever 136 is moved, the knife bar 134 alternately extends toward (and retracts from) the outside of the chopper housing 128. As knife bar 134 moves, it alternately extends stationary blades 132 into and pulls them out of corresponding blade apertures in the bottom of chopper housing 128.

In FIGS. 3 and 4, chopper rotor 130 is comprised of a longitudinally extending shaft 138 that extends the length of rotor 130 and supports the rotor for rotation in chopper housing 128. Rotor 130 further comprises a right circular drum 140 that is supported on and is coaxial with shaft 138. Chopper rotor 130 further comprises a plurality of knife assemblies 142 that are fixed on and disposed around the periphery of drum 140. In the embodiment of the figures herein, each of knife assemblies 142 are bolted to the drum with a plurality of threaded fasteners 144.

The knife assemblies 142 are arrayed around the circumference of drum 140 in sections that are staggered with respect to each other. Drum 140 has 7 longitudinal sections, each section comprises 6 knife assemblies 142 in each section, for a total of 42 knife assemblies fixed to the surface of drum 140. Each section is staggered in its circumferential position on the drum from the adjacent sections to distribute the impact of the knife assemblies 142 against the crop to twelve different evenly spaced angular locations as best shown in FIG. 4. All the knife assemblies 142 in each section are positioned and equal angular distance apart. Since there are 6 knife assemblies 142 in each knife section, each of the knife assemblies 142 are spaced apart 30°

In FIG. 5, chopper housing 128 comprises end walls 144, 146, a top sheet 148, and a bottom sheet 150. A longitudinally extending knife blade 152 is fixed to the inlet opening 118 of housing 128, and extent substantially across the entire width of the inlet 118. Twenty stationary blades 132 extend through corresponding slots in bottom sheet 150. Stationary blades 132 are all disposed in a row extending across substantially the entire width of chopper housing 128, spaced evenly apart and each stationary blade lying in a corresponding plane substantially parallel to the rotational axis 154 of the chopper rotor 130. Axis 154 is defined by bearings 156, 158 which support the chopper rotor 130 in end walls 144, 146 of the chopper housing.

In FIGS. 6-7 knife assembly 142 is shown. Knife assembly 142 is typical of all 42 of the knife assemblies fixed to chopper drum 140. Knife assembly 142 comprises a knife support 160 and a knife blade 162. Knife support 160 comprises a base portion 164 that is configured to be fixed to chopper drum 130. Knife support 160 further comprises a knife blade support 166 that is fixed to base portion 164 and extends upward therefrom, generally radially outward away from the rotational axis 154 of chopper rotor 130.

Support members 168 are fixed to the back of a knife blade support 166 and are fixed to base portion 164 to provide additional support for knife blade support 166.

Knife blade support 166 is generally in the form of a plurality (preferably 3) members 167 that extend radially away from base portion 164. Members 167 are located adjacent to each other a distant sufficient to provide a slot 170 between each member. Members 167 may be separate members or they may be joined at their bases by a narrow web 169.

The front faces of members 167 are generally co-planar to provide distributed support for knife blade 162 over substantially its entire width and height. The top edges 172 of members 167 are co-linear and extend parallel to base portion 164.

Slots 170 are defined by adjacent side walls 174 of members 167. Each pair of side walls 174 that define a slot 170 are spaced apart a distance sufficient to receive one of knife blades 132 therebetween. As the chopper rotor 130 rotates, each knife blade support 166 is rotated past knife blades 132 such that they pass between adjacent side walls 174, and extend into slot 170 substantially the entire depth of the slot, leaving a small amount of clearance at the bottom of the slot to prevent knife blades 132 from impacting web 169.

It is the passage of knife blades 132 through slots 170 that shears the cornstalks (i.e. the crop residue) in a direction parallel to the rotational axis 154 of the rotor. Knife blades 132 do not shear against members 167, however. Instead, the leading faces of the 3 members 167 are covered by 3 corresponding members 176 of knife blade 162 which has been dimensioned slightly larger than members 167. This overlap is indicated in FIG. 5 by the edges of knife blade 162 shown in solid lines, and the slightly recessed edges of members 167 shown in dashed lines.

Knife blade 162 overlaps and protects members 167 along both the top edges 172, the side edges of members 167 that define side walls 174, the outer edges 178 of members 167, and the edges that define the bottom of slots 170 in members 167.

Knife blade 162 is fixed to knife blade support 166 with threaded fasteners 180 that extend through corresponding holes 182 in knife blade 162 and holes 184 in each of members 167. The threaded fasteners are preferably carriage bolts that are secured with nuts on the side of the knife blade support 166 opposite knife blade 162.

Knife blade 162 is generally rectangular, and is divided into a plurality of members (three in this embodiment) by slots 188. Slots 188 are aligned with slots 170 in knife blade support 166 to receive Stationary blades 132 and to cause the crop residue, such as cornstalks, to be sheared between knife blade 162 and stationary blades 132. Stationary blades 132 are sharpened, and the edges of the slots 188 are not sharpened. Knife blades 162 function as anvils to support crop residue that is disposed generally parallel to the rotational axis of the combine. Stationary blades 132 cut through the crop residue resting on the leading face of knife blade 162 generally parallel to the rotational axis 154 as the stationary blades 132 pass through slots 188.

Slots 188 extend substantially the entire height of knife blades 162, but not entirely, thereby leaving web portions 190 at the bottom of slots 188 to extend between and hold the three members of knife blade 162 together.

The outermost edges of the three members of knife blade 162 are co-linear and extend slightly farther radially outward than the top edges 172 of members 167. Just like top edges 172, the outermost edges of the 3 members of knife blade 162 are co-linear and extend parallel to the rotational axis of drum 130. The outermost edges of the three members of knife blade 162 are disposed to cut against longitudinally extending knife blade 152.

In FIGS. 8 and 9, an alternative knife support 160' is shown together with an alternative knife blade 162'. The embodiment of FIGS. 8, 9 differs from the embodiment of FIGS. 6, 7 in only one respect. The middle threaded fastener 180 of FIGS. 6, 7 has been eliminated, and the corresponding holes 182, 184 in the knife blade 162 and the knife support 160 necessary to receive that fastener have also been eliminated. This arrangement is practical since the three sections of knife blade 162 are joined together with webs 190. Eliminating the middle threaded fastener 180 permits chopper rotor 130 to be reduced in weight as well as improving its balance. Eliminating the middle threaded fastener also reduces the cyclical loading on web portions 190, and permits looser tolerances for the manufacture of knife blade support 166'.

In FIGS. 10 and 11, knife support 160 is shown with an alternative knife blade 162". In this arrangement, knife blade 162" is fashioned in 2 separate pieces, 162A and 162B. It differs from the knife blade 162 embodiment of FIGS. 6, 7 in one respect only: One of the webs 190 shown in FIGS. 6, 7 has been completely eliminated, thereby providing a knife blade 162 into 2 pieces identified in FIGS. 10, 11 as knife blade 162".

Figure 12:
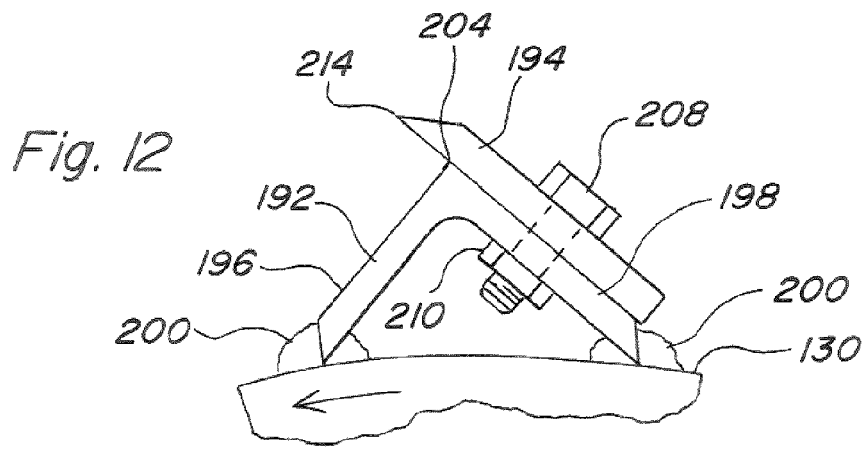
FIG. 12 is an end view of an alternative knife blade and blade support useable on the rotor of FIG. 3.
Figure 13:
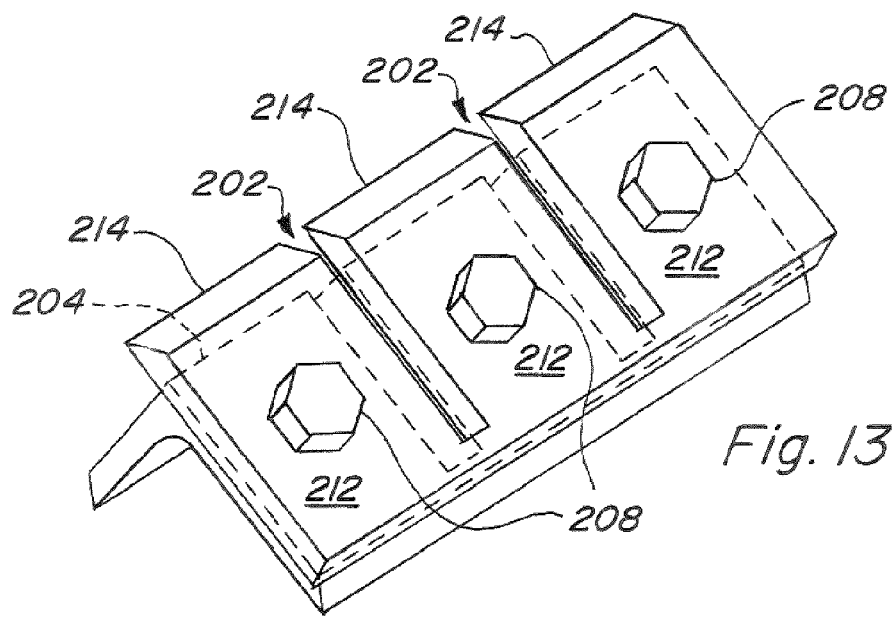
FIG. 13 is a perspective view of the alternative knife blade and blade support of FIG. 12.
Figure 14:
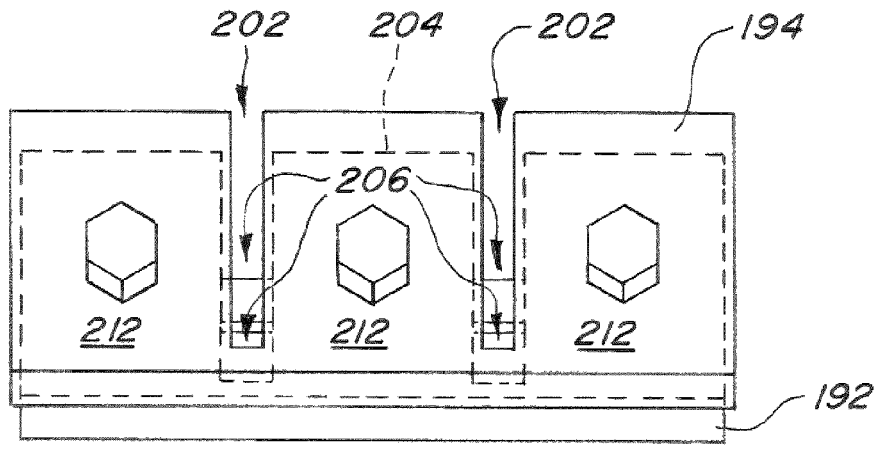
FIG. 14 is a rear view of the alternative knife blade and blade support of FIGS. 12-13.

In FIGS. 12-14, an alternative knife support 192 is shown supporting an alternative blade 194. The view in FIG. 12 is an end view, it is taken parallel to the longitudinal axis of the drum 130 on which knife support 192 is mounted. Knife support 192 is generally configured with a forward facing surface 196 and a rear facing surface 198. It is generally in the form of an angle bracket and defines an included angle of 90°. Knife support 192 can be used in place of any of the previously existing knife supports 160 and is distributed on the surface of drum 130 in the same locations and for the same purposes and to provide the same benefits as described above regarding any of the previously described knife supports. Knife support 192 differs from the other illustrated knife supports in that it is permanently attached to drum 130. Weldments 200 are provided to fix alternative knife support 192 to drum 130. Knife support 192 like the other knife supports described herein has a plurality of slots 202 that extend from an radially outermost edge 204 to a root 206 located adjacent to the surface of drum 130. Each of slots 202 is configured to pass a corresponding one of stationary blades 132 in the same manner and for the same purposes as the previously illustrated knife supports.

Knife blade 194 is fixed to the trailing face of knife support 192 instead of being fixed to a leading face of a knife support as shown in the examples of FIGS. 1-11. Knife blade 194 is secured to knife support 192 with a plurality of bolts 208. Bolts 208 are secured to the inside of knife support 192 with nuts 210. In one arrangement, shown herein each of the three members 212 is secured to a corresponding portion of knife support 192 by a bolt 208.

In another arrangement, knife blade 194 may be arranged as shown in FIG. 8 herein, in which two bolts, one disposed in each of the end members are used to fix the knife blade to the knife support and the center member has no hole for receiving a bolt, nor does the structure upon which it rests have a whole for passing a bolt therethrough.

Even further, knife blade 194 may be arranged as shown in FIG. 10 herein, in which only two of the three members 212 are joined together with a web and an additional at least one member is secured adjacent to the two members joined with a web with its own individual fastener.

Knife blade 194 is generally rectangular, and is divided into 3 members 212 that are generally rectangular in shape by slots 212. Each of members 212 as an outermost edge 214 that is preferably sharpened. These outermost edges 214 are preferably oriented in a line that is parallel to the rotational axis of the drum 130. Outermost edges 214 are disposed to cut plant matter (typically cornstalks) against longitudinally extending knife blade 152.

Slots 212 are aligned with corresponding slots 202 in knife blade support 192 to receive stationary blades 132 and to cause the crop residue, such as cornstalks, to be sheared between knife blade 162 and stationary blades 132. The edges of the slot 202 disposed in forward facing surface 196 of knife support 192 functions as an anvil to support the cornstalk for shearing by stationary blades 132 when stationary blades 132 passes into slot 202 with a cornstalk trapped therebetween.

While the embodiments shown herein include knife blades with a single slot and with a double slot, it should be clear that knife blades and the knife supports on which they are mounted can be fashioned in an identical manner with 4, 5, or 6 sections joined together with 3, 4, or 5 web portions to provide and elongate knife blade fixed to chopper from 130 having 3, 4, or 5 slots, respectively, to receive a corresponding 3, 4, or 5 stationary blades 132 and be supported on 4, 5, or 6 members 167 or 212.

The invention claimed is:

1. A knife blade (162, 162', 162", 194) for mounting on a knife support (160, 160', 192) of a chopper rotor (130) of a combine chopper (120), the knife blade (162, 162', 162", 194) being flat and extending generally in a plane, the knife blade having a mounting surface configured to be mounted on a trailing face of the knife support, the knife blade (162, 162', 162", 194) having a first edge configured to extend generally parallel to the longitudinal axis of the rotor when fixed to the chopper rotor (130), and having at least one slot (188, 202) formed in the first edge, wherein the at least one slot (188, 202) extends at right angles to the longitudinal extent of the first edge and divides the knife blade (162, 162', 162", 194) into a plurality of members (167, 212), wherein each member of the plurality of members (167, 212) is generally rectangular, and wherein the slot does not extend completely through the knife blade (162, 162', 162", 194) but leaves a narrow web of material at an edge of the knife blade that is opposite the first edge that serves to couple the plurality of members (167, 212) together, and further wherein the first edge of the plurality of members (167, 212) is configured to cut against a longitudinally extending knife blade (152) fixed to a chopper housing.

2. The knife blade (162, 162', 162") of claim 1, wherein the plurality of members (167) have outermost edges that are co-linear and are configured to cut crop residue against the longitudinally extending knife blade (152) that is fixed to a chopper housing (128), wherein the outermost edges are configured to be mounted to the chopper rotor such that the outermost edges extend parallel to the axis of chopper rotor rotation.

3. The knife blade of claim 2, wherein the outermost edges of the plurality of members are disposed at right angles to the two facing edges of the at least one slot (188) in the knife blade (162, 162', 162").

4. The knife blade (162, 162', 194) of claim 1, wherein the plurality of members includes a first (167, 212), a second (167, 212), and a third member (167, 212) and the at least one slot (188, 202) includes a first slot (188, 202) between the first and second members, and a second slot (188, 202) between the second and third members, respectively, and further wherein at least the first member and the third member define first and second holes, respectively, wherein the first and second holes are configured to receive first and second threaded fasteners to fix the first and third members, respectively, against the knife support.

5. The knife blade of claim 4, wherein the first, second and third members (167, 212) have substantially the same width in a direction parallel to the longitudinal axis of the chopper rotor and define substantially the entire length of the blade.

6. The knife blade of claim 4, wherein the second member (167, 212) defines a third hole configured to receive a third threaded fastener configured to fix the second member (167, 212) against the knife support (160, 160', 192).

7. The knife blade of claim 1, wherein the knife blade (194) is configured to be removably fastened to the trailing face of a knife support (192) on the chopper rotor.

8. The knife blade (194) of claim 7, wherein each slot (202) is defined by two facing edges disposed on either side of the slot (202) that are configured to receive and pass therethrough a second knife blade (132) that is fixed to a chopper housing, wherein the second knife blade (132) extends in a plane generally normal to an axis of chopper rotor rotation.

* * * * *